Dec. 20, 1927.
W. J. KASER
1,653,402
APPARATUS FOR MAKING PASTRY AND THE LIKE
Filed Sept. 20, 1924 4 Sheets-Sheet 1
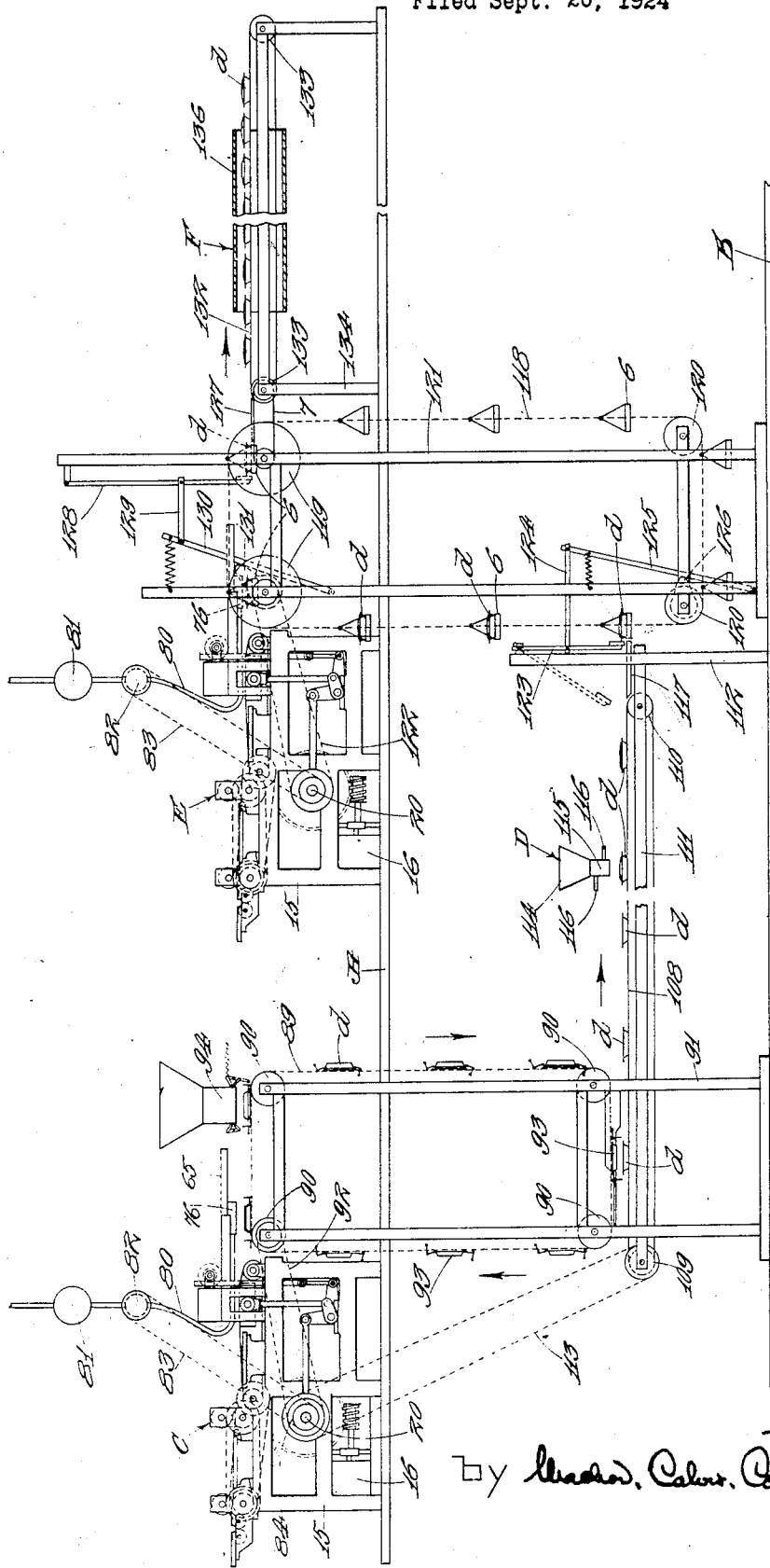

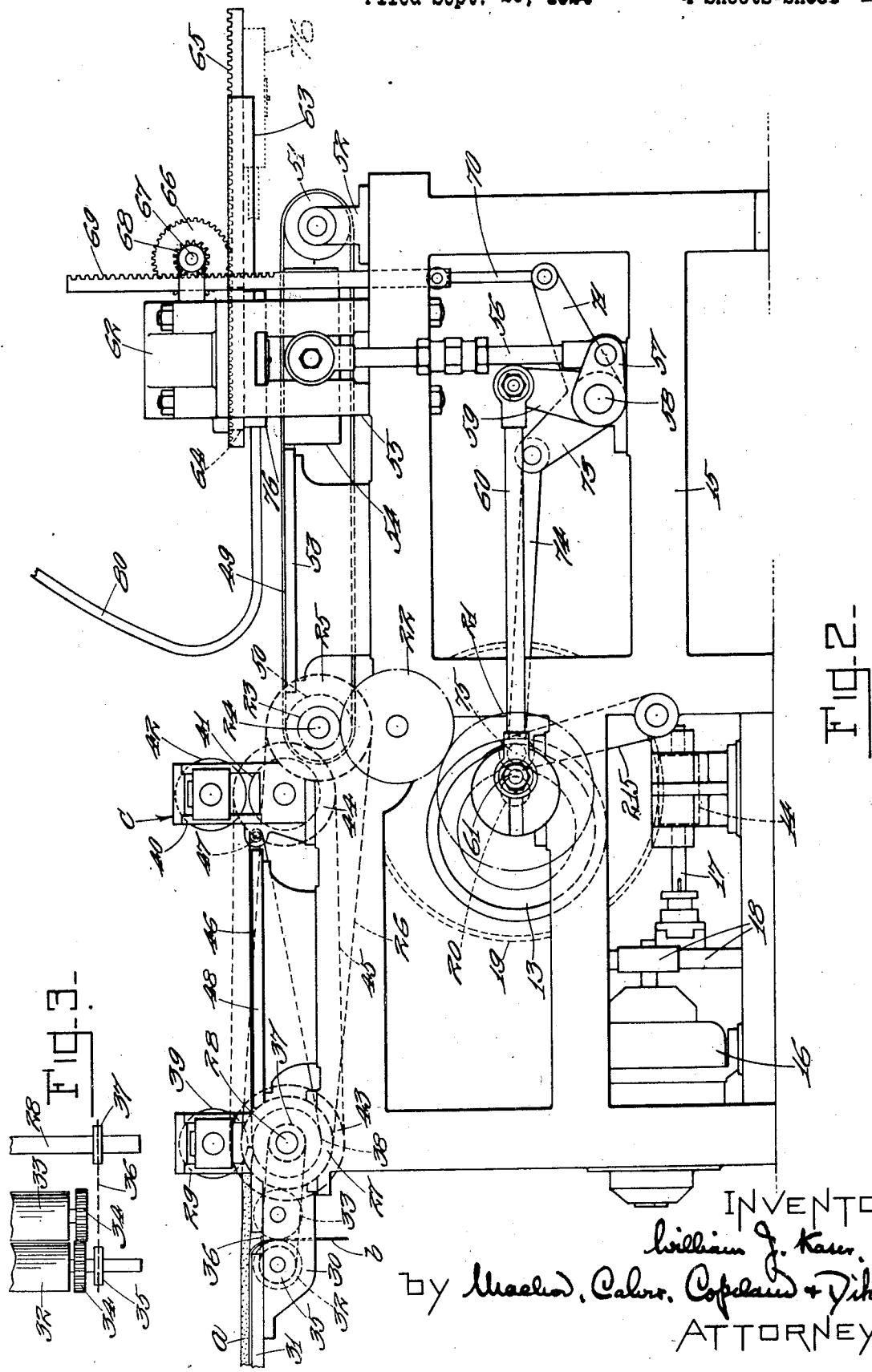

Dec. 20, 1927.
W. J. KASER
1,653,402
APPARATUS FOR MAKING PASTRY AND THE LIKE
Filed Sept. 20, 1924
4 Sheets-Sheet 3

INVENTOR
William J. Kaser
by Macleod, Calver, Copeland & Dike
ATTORNEYS

Dec. 20, 1927.  1,653,402
W. J. KASER
APPARATUS FOR MAKING PASTRY AND THE LIKE
Filed Sept. 20, 1924   4 Sheets-Sheet 4

INVENTOR:
William J. Kaser.
by Macleod, Calver, Copeland & Dike.
ATTORNEYS

Patented Dec. 20, 1927.

1,653,402

UNITED STATES PATENT OFFICE.

WILLIAM J. KASER, OF CHICAGO, ILLINOIS, ASSIGNOR TO COLBORNE MANUFACTURING COMPANY, OF CHICAGO, ILLINOIS, A CORPORATION OF ILLINOIS.

APPARATUS FOR MAKING PASTRY AND THE LIKE.

Application filed September 20, 1924. Serial No. 738,832.

This invention has for its object to provide automatic or semi-automatic apparatus for the rapid and economical production in quantities of pies or other pastry articles, and especially, although not exclusively, to apparatus for producing pies having upper and lower crusts enclosing filling material, although, as will be obvious from the following description, the apparatus might readily be adapted, by the mere omission of one or more of its elements, to the production of pies or similar pastry articles having an upper or a lower crust only.

The more particular objects of the invention, together with means whereby the latter may be carried into effect, will best be understood from the following description of one form or embodiment thereof illustrated in the accompanying drawings. It will be understood, however, that the particular construction and arrangement described and shown have been chosen for illustrative purposes merely, and that said invention, as defined by the claims hereunto appended, may be otherwise embodied without departure from its spirit and scope.

In said drawings:

Fig. 1 is a diagrammatic elevation of substantially the complete apparatus.

Fig. 2 is an enlarged side elevation of one of the blank forming units.

Fig. 3 is a fragmentary detail plan view of certain of the parts shown at the left in Fig. 2.

As shown in Fig. 1, the apparatus as a whole comprises a plurality of instrumentalities which are preferably arranged respectively at different elevations or upon upper and lower floors A and B and are connected by suitable conveyor mechanisms for carrying the pies or other articles to the several instrumentalities in succession. Said instrumentalities comprise a unit C for forming dough blanks and placing them in pans to constitute the lower crusts of the pies, a device D for supplying a suitable filling material to the blanks in the pans, a second unit E similar to the unit C for forming dough blanks and placing them over the filled pans to constitute the upper crusts of the pies, and an oven F through which the pies are carried and in which they are baked. It will be obvious that, by omitting one or the other of the units C or E, pies having only an upper or a lower crust, respectively, may be produced. Preferably, and in the arrangement shown, the instrumentalities C, E and F are arranged upon the upper elevation of floor A, while the instrumentality D is arranged upon the lower elevation of floor B.

Figures 4, 5, 6, 7, 8:
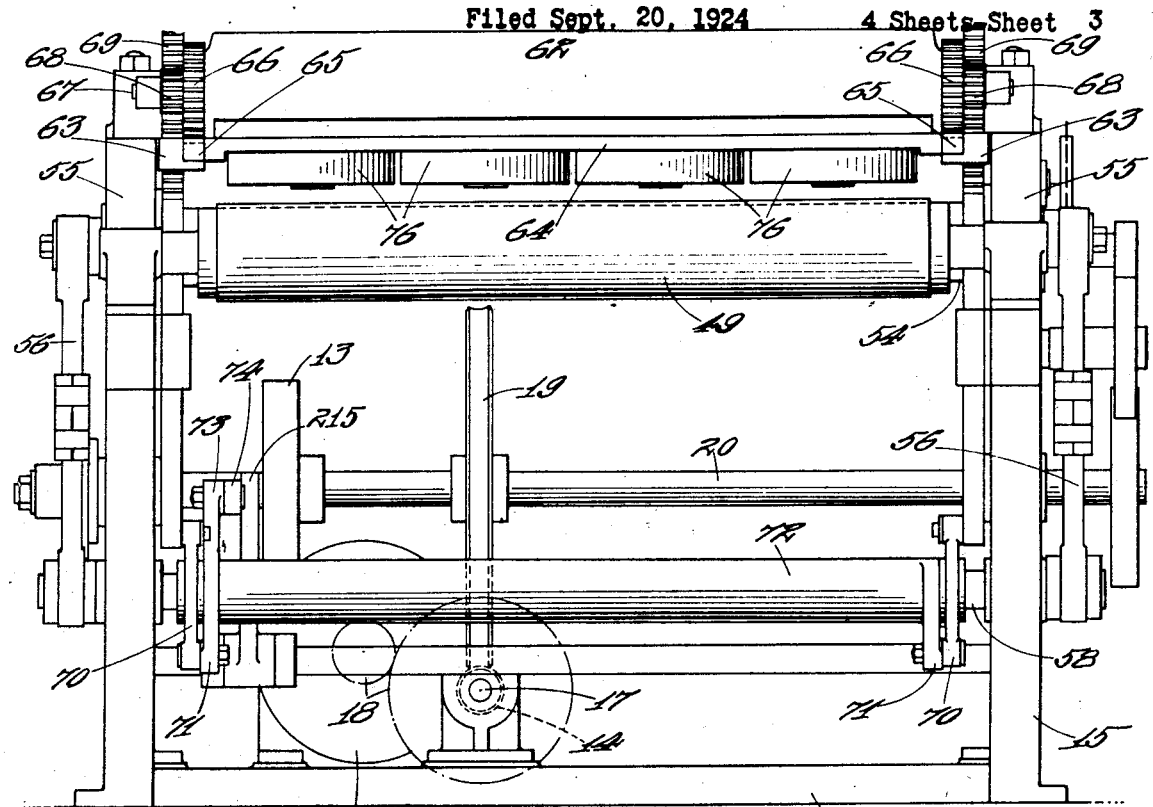
Fig. 4 is a rear elevation of the unit shown in Fig. 2.
Fig. 5 is an enlarged top plan view.
Fig. 6 is a rear elevation, partly in section, of the set of dies forming a part of the unit shown in Figs. 2 and 4.
Fig. 7 is a bottom plan view of one of the dies shown in Figs. 5 and 6.
Fig. 8 is a still further enlarged detail section taken substantially on the line 8—8, Fig. 6.

The units C and E are substantially identical with one another, and the construction of one of them is illustrated on an enlarged scale in Figs. 2, 3 and 4. Said unit comprises a suitable frame 15, in which is mounted an electric motor 16 or other suitable power generator or transmitter, the motors 16 of the two units C and E receiving current from the same source and being arranged to operate substantially in synchronism. The armature shaft of the motor 16 is connected by suitable gearing 18 with a shaft 17 carrying a worm 14 which meshes with a worm gear 19 on a main shaft 20 journalled in suitable bearings in the frame 15 and extending transversely across the latter. Fast on the shaft 20 is a gear 21 which meshes with a gear 22, rotatably mounted on the frame 15 and meshing with a gear 23 on a transverse shaft 24 journalled in suitable bearings in said frame. The shaft 24 carries a pulley or sprocket 25 connected by a belt or chain 26 with a pulley or sprocket 27 on another transverse shaft 28 journalled in suitable bearings in uprights 29 rising from the frame 15.

Carried by the frame 15 at the front thereof are brackets 30 supporting a table 31 and in which are journalled two parallel transverse rollers 32 and 33 connected for rotation in unison and in opposite directions by gears 34, (Fig. 3) the roller 32 being driven through a pulley or sprocket 35 on the shaft thereof and connected by a belt or chain 36 with a pulley or sprocket 37 on the shaft 28. Said last named shaft carries a roller 38 which cooperates with a spaced parallel roller 39 disposed above the same and also journalled in bearings in the uprights 29. Mounted on the frame 15 at the rear of the uprights 29 are similar uprights 40 in which are journalled a second pair of spaced parallel lower and upper rollers 41 and 42, the spacing of said rollers being somewhat less than the spacing of the rollers 38 and 39. The shafts of the rollers 38 and 41 are provided with pulleys or sprockets 43 and 44, respectively, connected by a belt or chain 45, the pulley or sprocket 43 being slightly larger than the pulley or sprocket 44, so that the roller 41 is driven at a slightly greater peripheral speed than the roller 38. Passing about the roller 38 is a conveyor belt 46 which also passes about an idler 47 journalled in the uprights 40 adjacent the roller 41, the upper reach of said belt passing over a table 48 supported at the top of the frame 15.

The mass of dough $a$, from which the blanks constituting the upper or lower crusts, as the case may be, are cut out, is roughly flattened out by an operator upon a sheet of canvas $b$, or other suitable flexible material, is placed with said sheet upon the table 31, and its rear edge inserted between the rollers 38 and 39 which tend to draw the same rearwardly and roll it out into a sheet. The rear edge of the canvas or other flexible material $b$ is allowed to depend between the rollers 32 and 33 which act to draw the same away from the dough $a$, as the latter is drawn through the rollers 38 and 39, and eventually discharge said sheet $b$ at the front of the machine where it may be taken up and used again. The sheet $a$ of dough, as it passes between the rollers 38 and 39, is received upon the conveyor belt 46 which carries it to the rollers 41 and 42. Since the spacing of the latter rollers is less than that of the rollers 38 and 39, and since the rollers 41 and 42 are driven at a correspondingly greater peripheral speed, the effect of the successive pairs of rollers on the dough sheet is to roll the latter out progressively to the desired thickness.

From the rollers 41 and 42 the dough sheet is received upon a second conveyor belt 49 which passes about a roller 50 on the shaft 24 and a second roller 51 journalled in brackets 52 on the top of the frame 15. From the roller 50 the upper reach of the belt 49 passes successively over a fixed support or table 53 carried by the top of the frame 15 and a reciprocating cutting table 54 guided in uprights 55 rising from said frame. The cutting table 54 is vertically reciprocated in its guides in the uprights 55 by means of pitmen 56 connecting said table with arms 57 on a transverse rock shaft 58 journalled in bearings in the frame 15 and having an arm 59 connected by a rod 60 with a crank pin 61 on the shaft 20. The uprights 55 are connected at their tops by a fixed cross head 62 provided with horizontal guides 63 for a sliding die carrier 64 movable in said guides between the position shown in full lines in Fig. 2 immediately over the cutting table 54 and the discharging position shown in dotted lines in said figure. The die carrier 64 is provided with racks 65 which mesh with pinions 66 on a shaft 67 journalled in suitable bearings carried by the cross head 62. The shaft 67 has fast thereon a second pair of pinions 68 which are engaged by racks 69 guided for vertical movement in the frame 15. The racks 69 are longitudinally reciprocated to oscillate the shaft 67 and reciprocate the die carrier 64 in its guides 63 by means of pitmen 70 connecting said racks with arms 71 on a sleeve 72 mounted to oscillate on the shaft 58 and having an arm 73 connected by a link 74 with a radius arm 215 carrying a cam roller 75 which cooperates with a cam 13 on the shaft 20.

The die carrier 64 is provided with a transverse series or gang of dies 76 each comprising an endless cutting edge 77 surrounding a suction chamber 78 and projecting beyond the latter, as shown in Fig. 6, the configuration of said cutting edge being in accordance with the shape of the blanks which are to be cut from the sheet of dough and being herein shown as circular. The suction chamber 78 is secured, as by screw bolts 12, to the carrier 64, and is provided with a perforated or foraminous wall 79 adapted to engage the blanks cut out by the cutting edge 77. The several suction chambers 78 are connected by flexible tubes 80 with a suitable suction pump diagrammatically shown at 81 in Fig. 1 and between which and the dies is interposed a valve 82 for controlling the suction from said pump to the dies. Said valve 82 may be of any suitable type, being shown in Fig. 1 as of the rotary type and as continuously rotated by means of a belt 83 connecting the same with a pulley 84 on the shaft 20. The arrangement is such that when the dies 76 are over the cutting table 54, as shown in full lines in Fig. 2, said cutting table rises, carrying with it the upper reach of the conveyor 49 with the sheet of dough thereon, and presses the latter against said dies which operate to cut out blanks from said sheet. At this time suction is applied to said dies through the tubes 80, causing the blanks to adhere to the walls 79 of said dies which, as the cutting table descends, are moved into the position shown in dotted lines in Fig. 2 carrying said blanks with them. When the dies reach the latter position, the suction is discontinued, permitting the blanks to drop from the dies.

The suction chambers 78 surround plugs or blocks 85 secured, as by screws 86, to the die carrier 64, the plugs 85 of the dies of unit E, which form the blanks constituting the upper crusts, having secured thereto, as by screws 87, markings stamps 88 for impressing the dough blanks with any suitable character, such as the trade mark of the maker or a letter or symbol to indicate the character of the product.

Figure 9:
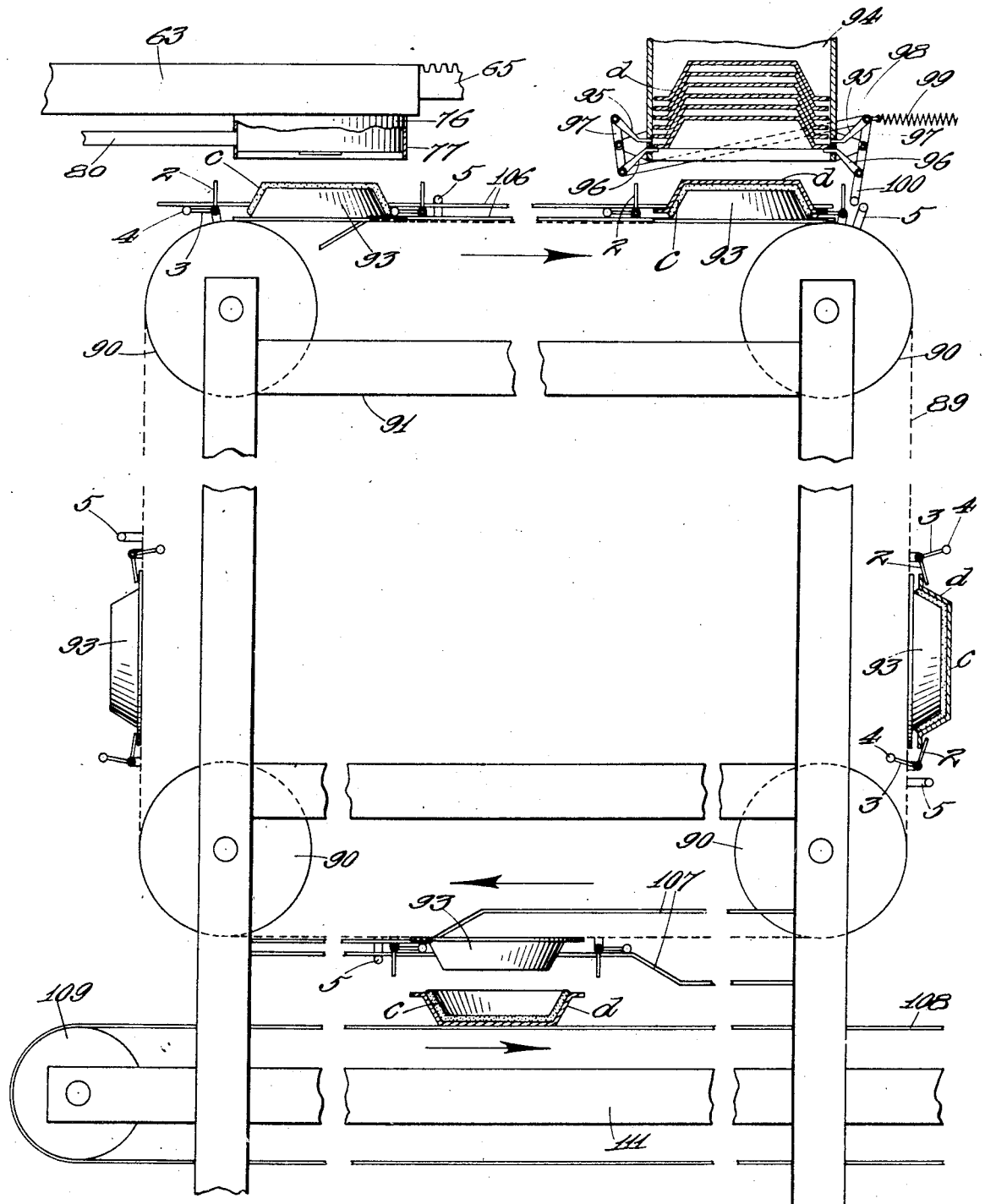
Fig. 9 is an enlarged side elevation of the mechanism for handling the pans in which the pies or other pastry articles are assembled and baked.

Adjacent the mechanism or unit C, and in a position to receive the dough blanks from the dies of the latter, is a conveyor or elevator in the form of an endless belt 89 having an upper reach disposed above the floor A and in proximity to the dies 76 when the latter are in discharging position, a lower reach between the floors A and B, and vertical reaches passing through the floor A, said belt passing about suitable pulleys or rollers 90 journalled in a suitable frame 91, and one of which is driven by a belt 92 from the shaft 20 of the unit C. The conveyor 89 carries a series of formers 93 of frustoconical form adapted to pass successively under the dies 76 when the latter are in their discharging position and receive therefrom the dough blanks $c$ (Fig. 9) when the latter are dropped by the interruption of the suction to the dies, as above explained. Also adjacent the upper reach of the conveyor 89 beyond the dies 76 is a hopper 94 adapted to contain a stack of nested and inverted pans $d$ of a shape generally similar to the shape of the formers 93. The pans $d$ are fed singly from the hopper 94 by means of escapement mechanism comprising two pairs of fingers 95 and 96 carried by levers 97 pivoted to brackets carried by the lower end of the hopper, said levers being diagonally connected by a cross link 98 and being normally held in the position shown in Fig. 9 by a spring 99, one of said levers having an extension 100 which is engaged by a series of trips 5 carried by the conveyor 89 adjacent the formers 93 respectively. The arrangement is such that the lower fingers 96 operate normally to support the stack of pans $d$, but as each former 93, with a dough blank $c$ thereon, is brought beneath the hopper, the corresponding trip 5 engages the extension 100 of one of the levers 97, causing the fingers 95 to be inserted between the lowermost pan in the hopper and that immediately above and the fingers 96 to be thereupon withdrawn to permit the lowermost pan to drop and be deposited upon the former and the dough blank carried thereby.

Figure 10:
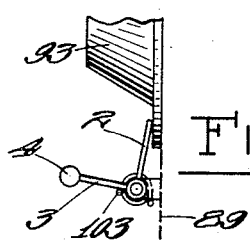
Fig. 10 is an enlarged detail view of one of the pan latch devices.

As each pan $d$ is thus deposited, it is secured to the conveyor 89 by a pair of latch devices carried by said conveyor, there being a pair of such devices adjacent each of the formers 93. Each of said latch devices comprises a pivoted finger 2 adapted to engage the edge of the pan and normally pressed into engagement therewith by a spring 103 (Fig. 10), said finger having an operating arm 3 formed with an angularly offset end 4 adapted to engage fixed cam guides 106 and 107 adjacent the upper and lower reaches respectively of the conveyor 89. The arrangement is such that as each former 93 is brought to the upper reach of the conveyor, the cam guides 106 operate to release the latch devices and hold them in released position until the deposit of a pan from the hopper 94, as shown at the top in Fig. 9. Thereafter the latch devices pass out of engagement with the guides 106, placing them under the influence of their springs 103, and causing them to engage the edges of the pan and retain the same on the conveyor during the descent of said pan along one of the vertical reaches of the conveyor, as shown at the right in Fig. 9. As the pans are carried along the lower reach of the conveyor, and thereby brought into upright position, the latch devices are engaged by the cam guides 107 and are thereby released, permitting the pan with its contained dough blank $c$ to drop from the conveyor, as shown at the bottom in Fig. 9.

The pans $d$ with their contained dough blanks $c$ thus discharged from the conveyor 89 are received upon the upper reach of a conveyor belt 108 which passes about rollers 109 and 110 carried by horizontal frame members 111 supported from the floor B by the frame 91 and a second frame 112, the rollers 109 being driven by a belt 113 from the shaft 20 of the unit C. The pans $d$ are carried along by the upper reach of the conveyor belt 108 beneath the mechanism D which comprises a hopper 114 for containing the filling material and having discharge spouts 115 controlled by measuring valves 116 which may be manually or automatically operated to deposit a predetermined quantity of material in the blank $c$ carried by each pan $d$.

The pans $d$ are delivered by the conveyor 108 upon a short table 117 carried by the frame 112 and from which said pans are carried by a conveyor or elevator to the unit E. Said elevator comprises a pair of endless chains 118 which pass about upper and lower sprockets 119 and 120 carried by suitable shafts journalled in an upright frame 121 and one of which is driven by a belt 122 from the shaft 20 by the unit E. The chains 118 have suspended between them a series of flights 6 adapted respectively to receive the several pans $d$ from the table 117, said pans being transferred from said table to the said flights, as the latter are brought successively opposite the former, by means of pusher mechanism comprising a swinging arm 123 pivoted to the frame 112 and connected by a link 124 with a lever 125 pivoted to the base of the frame 121 and operated by a cam 126 on the shaft of the forward pair of lower sprockets 120.

The pans $d$ are carried by the flights 6 beneath the dies 76 of the unit E, the arrangement being such that the pans are successively brought into position to receive dough blanks from said dies in such a manner as to cause said dough blanks to cover the filling material deposited upon the blanks $c$ already in the pans, thereby completing the pies. From the dies 76 of the unit E the flights 6 carry the pans $d$ along the upper reach by the conveyor to a stationary table 127 to which they are transferred from said flights by a second pusher mechanism comprising an arm 128 pivoted to the frame 121 and connected by a link 129 to a second arm 130 pivoted to the frame and operated by a cam 131 on the shaft of the forward pair of upper sprockets 119. The pusher mechanism last described operates to transfer the pans $d$ over the table 127 to the upper reach of a conveyor belt 132 carried by drums 133 journalled in the frame 134 of the unit F, one of said drums being driven by a belt 7 from the shaft of the rear pair of sprockets 119. The conveyor belt 132 extends through an elongated oven 136 of the unit F, so that the pies in the pans $d$ are baked during their passage therethrough.

Having thus described my invention, I claim:

1. In a pastry apparatus, in combination, rollers for rolling out a mass of dough into a sheet, a conveyor arranged to receive the sheet from said rolling out means, means cooperating with said conveyor to cut out blanks from the sheet, means for relatively moving said first means and conveyor to cut out the blanks, and means for reciprocating said first means toward and from said conveyor to deliver the blanks.

2. In a pastry apparatus the combination of a support for a flexible sheet carrying a mass of dough, mechanism for feeding the dough away from said sheet and for rolling the dough into sheet form, means for removing said sheet from the dough, and mechanism for first forming the dough sheet into pan shape and then transferring it to a pan to receive a filler.

3. In a pastry apparatus the combination of a support for a flexible sheet carrying a mass of dough, mechanism for feeding the dough away from said sheet and for rolling the dough into sheet form, means for removing said sheet from the dough, a pan shaped former, means for applying the dough to the outside thereof, and means for transferring the dough from the outside of said former to the inside of a pan.

4. In a pastry apparatus, in combination, a conveyor carrying a series of formers, mechanism for depositing dough in sheet form upon said formers, means for depositing pans upon said formers, and means for moving said conveyor to bring said formers successively into position to receive dough from said depositing mechanism and thereafter into position to receive pans from said pan depositing means.

5. In a pastry apparatus, the combination of means for rolling out a sheet of dough, cutting means for cutting out blanks from the sheet, a conveyor carrying a series of formers, means for shifting said cutting means into position to deposit the blanks on said formers, means for depositing pans upon said formers, and means for inverting the formers and pans to remove the latter with the dough from the formers.

6. In a pastry apparatus, in combination, a conveyor carrying a series of formers, mechanism for forming dough blanks and depositing them upon said formers, a pan hopper, means for feeding pans singly from said hopper, and means for moving said conveyor to bring said formers successively into position to receive blanks from said forming and depositing mechanism and thereafter into position to receive pans from said hopper.

7. In a pastry apparatus, in combination, an endless conveyor having upper and lower reaches and carrying a series of formers, means arranged adjacent the upper reach of said conveyor for depositing dough blanks upon said formers, means also arranged adjacent said upper reach for depositing pans upon said formers, and means for moving said conveyor in the direction to cause said formers to travel successively along said upper reach from said blank depositing means to said pan depositing means and thereafter to pass about said lower reach to drop said pans with the blanks therein.

8. In a pastry apparatus, the combination of a pan support, a conveyor carrying a series of formers and adapted to carry the formers past said pan support, means for delivering dough upon said formers, and devices carried by said conveyor for controlling the delivery of pans from said pan support upon said formers.

9. In a pastry apparatus, the combination of mechanism for supplying dough blanks to pans, means for supplying filling material to the blanks in the pans, means for rolling dough into sheet form, and vacuum mechanism for carrying the rolled dough into position to be deposited over the tops of said pans.

10. In a pastry apparatus, the combination of means for supporting a series of pans previously supplied with a bottom crust and a filler, means for rolling dough into sheet form, and vacuum means for carrying said rolled dough from said rolling means into position to deposit the same over the tops of said pans.

11. In a pastry apparatus, the combination of means for supporting a series of pans previously supplied with a bottom crust and a filler, devices for rolling dough into sheet form, vacuum means for carrying said rolled dough from said rolling means into position to deposit the same over the tops of said pans, and cutters for cutting the rolled dough sheet into blanks.

12. In a pastry apparatus, the combination of a conveyor carrying a series of inverted pan shaped formers, means for depositing dough on the outside of said formers, means for depositing pans in inverted position over the outside of the formers, and means for moving said conveyor into position to invert said formers and discharge the pans therefrom with the dough within the pans.

13. In a pastry apparatus, the combination of a set of formers for forming dough in pan shape in pans while the latter are in inverted positions, a conveyor having means for supporting said formers while in inverted positions and means for releasably holding the pans over the formers to permit the pans and formers to be inverted to discharge the pans therefrom with the dough within the pans.

14. In a pastry apparatus, the combination of a support for carrying a set of inverted pans, a similar set of inverted pan shaped formers, and a conveyor for moving said formers to receive dough and thereafter to receive said pans on the outside of the formers.

15. In a pastry machine, the combination of forming means for forming dough in pan shape in a pan or pans while the latter are in inverted position, a conveyor carrying said forming means and movable into position to invert said forming means and discharge the pans therefrom with the dough within the pans.

16. In a pastry machine, the combination of an inverted pan shaped former, means for depositing rolled dough in sheet form upon the outside of said former, an inverted pan being placed over the dough and former, a conveyor, and means for inverting the pan and said former to discharge the pan and dough from said former upon said conveyor.

17. In a pastry machine, the combination of a conveyor comprising upper and lower horizontal reaches, transverse rows of inverted pan shaped formers carried by said conveyor, means for applying dough to the outside of said rows of formers at the upper reach of the conveyor, pans being then deposited over said formers at said upper reach, and means for causing the conveyor to travel into position to invert the position of the rows of formers and pans at the lower reach of the conveyor, thereby to discharge successive rows of pans with the dough therein.

18. In a pastry machine, the combination of means for rolling out and feeding in one direction a sheet of dough, means for supporting a transverse row of pans each containing a filler, means for simultaneously cutting from said rolled dough sheet dough for the top crust of said pans, means for applying vacuum to said cutting means to pick up the dough cut from the rolled sheet, means for moving said cutting means over the pans to deposit the dough thereon, and mechanism for returning said cutting means for a succeeding operation.

In testimony whereof I affix my signature.

WILLIAM J. KASER.